United States Patent Office 3,134,460
Patented May 26, 1964

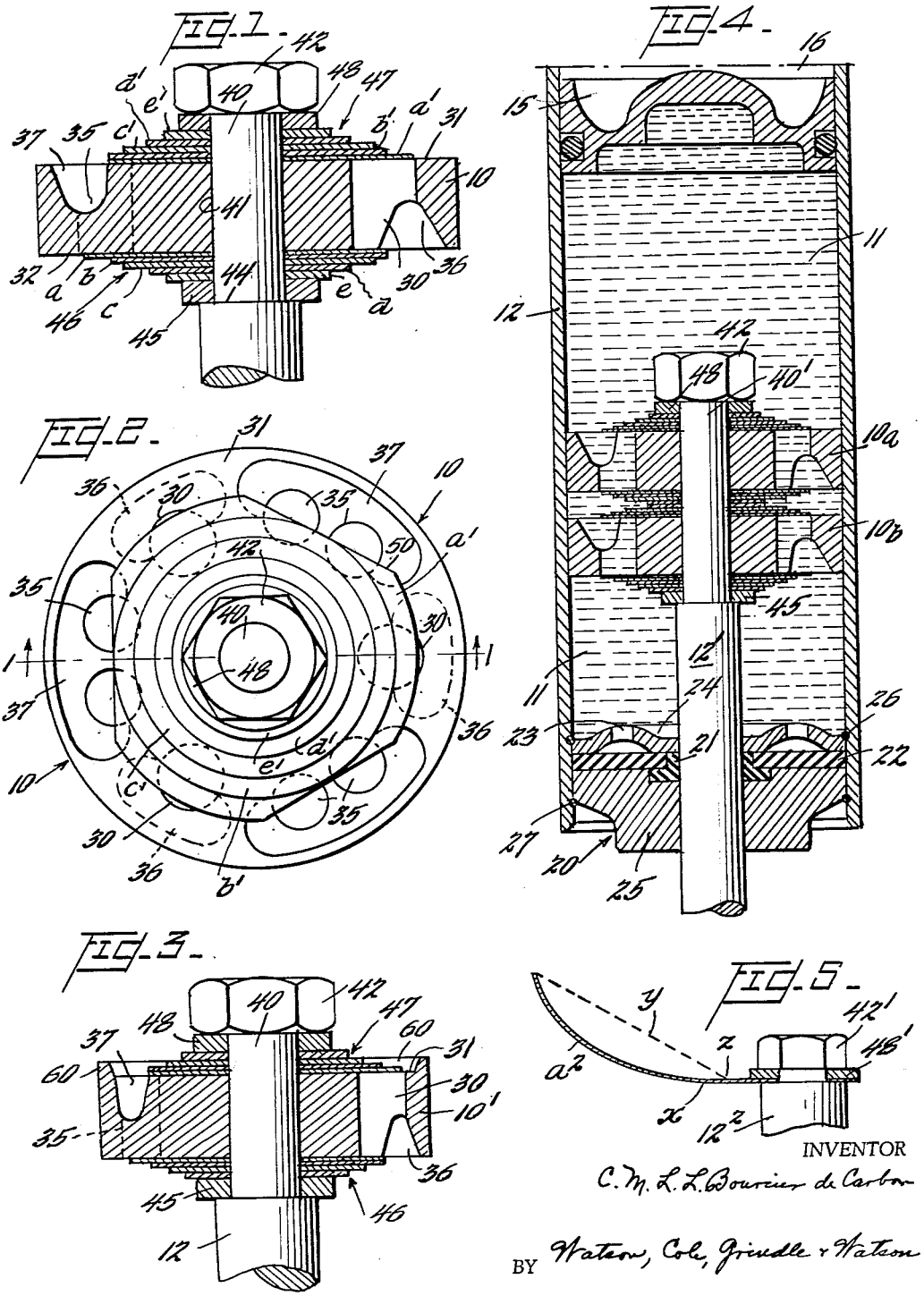

3,134,460
HYDRAULIC SHOCK ABSORBER WITH
IMPROVED VALVING
Christian Marie Lucien Louis Bourcier de Carbon,
64 Blvd. Maurice-Barres, Neuilly-sur-Seine, France
Filed May 23, 1962, Ser. No. 197,028
Claims priority, application France June 2, 1961
7 Claims. (Cl. 138—88)

This invention relates to shock absorbers and more particularly to improvements in direct-acting telescoping cylinder-and-piston shock absorbers commonly used to damp the relative movements of automobile bodies and wheel suspensions or in similar installations.

The general object of the invention is to provide a novel and improved shock absorber of the class described which is of sturdy and durable construction throughout so as to perform heavy-duty service without breakdown or rapid deterioration.

It is already well known in the art to employ thin metallic discs as flexible valving members for the orifices of passageways provided through the pistons of said telescoping shock absorbers to control the flow of damping liquid through the piston in either direction upon movement of the piston within the cylinder.

Such thin valve discs deform elastically under the action of the damping liquid and thus permit the passage of the fluid through the piston. However, in most constructions of this type the deformation of the discs, in general, takes place only in the immediate vicinity of the clamped area of the disc, and the free portion of the disc assumes substantially the shape of a truncated pyramid or cone, with the result on the one hand, that the law of flow of the liquid as a function of the pressure exerted by the liquid on the valve disc is irregular and erratic, and on the other hand, that fractures of the discs are soon produced in the flexure zone as a result of the fatigue of the metal.

One proposal for overcoming this drawback is to provide a partially spherical clamping or contact surface against which the discs rest upon maximum deformation.

It has also been proposed, as for example in accordance with my prior United States Patents 2,748,898 and 3,003,594, to provide, against the two opposite faces of the piston, in order to control the orifices of the passageways therethrough, a stack of valve discs of decreasing diameters in the direction away from the face of the piston.

These solutions improve to some degree the operating characteristics of these telescoping shock absorbers but do not provide a complete answer to the problems.

Therefore, the present invention contemplates the provision on each of the two faces of a piston of a shock absorber of the class described, a stack of the discs or washers characterized by the fact that they are of decreasing diameter, but of increasing thickness, as counted in the direction away from the piston face. This makes it possible to obtain a practically perfect uniformly distributed deformation of the stacked discs, and thus obtain both an excellent mode of operation and a considerable decrease in the fatigue of the metal of which the discs are made, and therefore a practically complete elimination of changes in the characteristics of the shock absorber as the result of wear.

Another feature of novelty of the present invention consists in providing on at least one face of the piston a marginal flange or skirt which makes it possible to increase the bearing surface of the piston upon the walls of the cylinder, and therefore improves its guidance during its movements in the cylinder, particularly in the extreme expanded position of the shock absorber where the supporting length of the wall-to-wall contact is increased by the added height afforded by such skirt.

A further object of the present invention is to provide a shock absorber of this type especially designed for very heavy vehicles, this shock absorber comprising a piston consisting of two or more heads arranged serially along the piston rod, each of the multiple piston heads being preferably constituted so as to afford the purposes and advantages above set forth.

Other objects and features of novelty will be apparent from the following specification when read in connection with the accompanying drawings in which certain embodiments of the invention are illustrated by way of example.

In the drawings:
FIGURE 1 is a view in vertical section of a piston embodying one of the principles of the present invention;
FIGURE 2 is a top plan view of the piston shown in FIGURE 1;
FIGURE 3 is a view similar to FIGURE 1 but illustrating an added cooperating feature to the piston;
FIGURE 4 is a view in vertical section through a multi-head piston assembly and the major portion of the shock absorber cylinder in which it works; and
FIGURE 5 is a diagrammatic or schematic view illustrating the principles of flexure of the valve discs.

In observing the embodiment shown in FIGURE 1 of the drawings, it should be assumed that the piston 10 occupies a position within the cylinder of the shock absorber in the same manner as illustrated in the alternative embodiment shown in FIGURE 4. In other words, the piston 10 reciprocates within the body of damping liquid indicated at 11 which is contained within the cylindrical casing 12. The upper head of the cylinder 12 is not shown and may be of any appropriate construction, this particular embodiment of the invention having been illustrated in connection with a pressurized shock absorber in which a floating piston designated generally by the reference numeral 15 divides the interior of the cylinder 12 into a working chamber containing the fluid 11 and an upper pressure chamber 16 in which a gas under pressure is confined. However, in spite of this specific illustration, the principles of the present invention are applicable to reciprocating shock absorbers whether of the pressurized or non-pressurized type.

The piston rod 12 to which the piston 10 of the embodiment shown in FIGURE 1 is attached has its counterpart in the rod 12' of FIGURE 4 and passes through a sealing device which closes the lower end of the cylinder 12 and is given the general designation 20. This sealing arrangement besides providing a closure for the end of the cylinder, contains an annular seal 21 which is pressed against the walls of the piston rod by means of the resilient disc 22, pressure from the liquid 11 being permitted to pass through the openings 23 in the inner rigid disc member 24 to assist in the inward radial pressure against the seal element 21. The outer retaining member 25 completes the packing assembly and the entire device is retained in place within the end of the cylinder as by means of the snap rings 26 and 27.

Now with specific reference to the embodiment shown in FIGURES 1 and 2 of the drawings, it will be understood that a series of passageways 30 (three in this embodiment) pass through the piston 10 from the upper face 31 to the lower face 32 thereof and it will be understood that these pasageways are for the control of the movement of fluid from the body of fluid beneath the piston 10 to the portion above the piston, during the downward or expansion stroke of the piston.

Another series of passageways 35 (three twinned passageways in this instance) pass through the piston 10 and serve to control the flow of fluid from the upper side of the piston 31 to the lower side of the piston 32 as upon the upward or compression stroke of the piston.

By preference, the inlet orifices of the passageways 30 and 35 are enlarged as for example, by means of the kidney-shaped recesses or openings indicated respectively at 36 and 37, the recesses 37 being of sufficient arcuate extent to embrace the openings into a pair of passageways 35.

These enlargements at the intake ends of the passageways serve useful purposes, among which may be mentioned the provision for unrestricted inlet flow which is not to be controlled by the discs, the discs being intended to control the outlet orifices of the other set of passageways on the same face of the piston.

Continuing the description of the embodiment shown in FIGURES 1 and 2, it will be seen that the piston rod 12 has an attenuated portion 40 which passes through a central axial opening 41 in the piston 10 and has a threaded end upon which the clamping nut 42 is screwed. Surrounding the attenuated portion 40 of the piston rod in order, counting from the shoulder 44 of the piston 12, are the clamping ring 45, the compression controlling set of valve discs 46, the piston 10 itself, the upwardly disposed expansion control valve discs 47, the clamping disc 48, and finally the nut 42.

The discs comprising the set 46 consist of five separate discs or washers which are designated $a$, $b$, $c$, $d$, and $e$. It will be noted that the inward disc $a$ which rests flat against the piston surface 32 is the thinnest of the discs and the one of greatest diameter. Disc $b$ is of smaller diameter but somewhat thicker than disc $a$. Disc $c$ is smaller and thicker than disc $b$ and the same increasing thickness and decreasing diameter prevails through the complete set of five discs.

Although five discs are shown, the invention in its broadest aspects is not strictly limited thereto, but it has been found that from three to five discs afford the optimum results in this inventive development.

The set of valve discs 47 at the top of the piston 10 comprise the separate discs $a'$, $b'$, $c'$, $d'$, and $e'$, and these discs are graduated as in the case of the stack 46 in decreasing diameters and increasing thickness as counted away from the surface of the piston.

As clearly shown in FIGURE 2 of the drawings, in order to provide a still wider entry upon the intake side of the passageways, the widest disc $a'$ at least has segments cut away as at 50 adjacent the openings 37 of the passageways 35. The disc $a$ upon the underside of the piston may be similarly cut away adjacent the openings 36 of the passageways 30 if desired.

The cutting away of these segments also has certain advantages in permitting a better flexing of the discs themselves.

Now referring to the diagrammatic showing in FIGURE 5, where only one disc $a^2$ is shown clamped to the piston rod $12^2$ as by means of the ring 48' and the nut 42', it will be seen that due to the presence of the other discs (not shown) graduated in thickness as described, the curvature of the disc $a^2$ is quite gentle, and the beginning of the flexure say adjacent the point $x$, is located quite a ways from the clamping area of the ring 48'. Now if the disc $a^2$ were used alone or even stacked with additional thin discs, the line of bending would be as indicated along the dotted line $y$ and there would be a ring of sharp flexure as suggested at $z$ and this would very soon result in fatigue and fracture of the disc.

Now referring to the embodiment shown in FIGURE 3 of the drawings it will be understood that this embodiment contains all of the improvements described in connection with FIGURES 1 and 2 and the corresponding parts will be given the same reference designations. In this instance at least the upper set of discs 47 as well as the orifices of the passageways 30 and 35 are contained within an annular flange or skirt 60 which is formed peripherally of the upper surface of the piston here designated 10'. The provision of this rim or skirt 60 makes it possible, without increasing the thickness of the piston 10 and therefore the length of the passageways 30 and 35, to increase the area of the sliding surface of the piston 10 against the walls of the cylinder 12 and in particular to increase the supporting distance or area of the piston and rod assembly when the piston is in the position of maximum expansion or bottom dead-center. As a matter of fact, the piston rod 12 is guided during its reciprocating movements by the seal assembly 20 and the peripheral contact face of the piston 10 against the wall of the cylinder 11. When the piston is in the position of maximum expansion, the supporting distance between the packing and the slide surface of the piston is extremely small and there is danger, due to the fact that the rod is subjected during use to very rapid and very violent movement, that the rod will not remain absolutely fixed on its reciprocating axis, and this could cause either a jamming of the piston in the cylinder or excessive wear of the slide surface of the piston, which wear results in leaks of damping liquid between the piston and the walls of the cylinder and thereby changes the operating characteristics of the shock absorber.

The skirt 60 disposed preferably around the upper face of the piston 10 reduces this drawback, increasing at the same time the sliding surface and the minimum supporting distance of the rod 12.

In FIGURE 4 there is shown a multiple headed piston for use in connection with the damping of heavy vehicles, for example for trucks of large tonnage or railway cars. This embodiment includes the provision of a piston head 10a and a second piston head 10b arranged serially on the attenuated portion 40' of the piston rod 12'. Each of the heads 10a and 10b are identical with the piston 10 shown in FIGURES 1 and 2 of the drawings and the means for clamping the several parts together are quite similar except for the possible elimination of a central intervening washer between the adjacent sets of valve discs on the respective lower surface of the upper piston head and upper surface of the lower piston head.

Shock absorbers intended for use in railway cars or heavy trucks must absorb considerable forces and it is rather difficult therefore to make them with sufficient precision in their various adjustments, the dispersion or departures increasing rapidly with the value of the braking co-efficient of the apparatus. By the use of two pistons such as 10a and 10b in FIGURE 4 the shock absorbers are provided with a high constancy in quality of production and greater precision, since the forces to which the discs are subjected are half as great, and the devices being doubled, there is a relative compensation for errors. It is also obvious that the invention is not limited in its broad scope to the provision of a double headed piston, but there can be provided more than two pistons on the same rod depending on the forces involved. Thus, the use of such shock absorbers is not limited to vehicles such as railway cars or heavy trucks but can be expanded to take care of additional loadings.

It should be borne in mind that the two pistons characterizing the present invention are duplications of each other both in respect to construction and in direction and positioning; in other words, they are duplicated, but the arrangement is not symmetrical in that the pistons are not "mirror images" of each other. Thus, a genuine cumulative effect of the action of both pistons is attained.

It is to be understood that various changes and modifications may be made in the embodiments illustrated and described herein without departing from the scope of the invention as defined by the following claims.

Having thus described the invention, what is claimed as new and desired to be secured by Letters Patent is:

1. A direct-acting telescoping cylinder-and-piston shock absorber comprising a cylinder enclosing a working chamber containing a damping liquid; a working piston disposed for reciprocation in said damping liquid within said chamber and having a piston rod fixedly secured thereto and extending through a packed opening in one end of said cylinder; valving means in the piston for the controlled passage of damping liquid in opposite directions through the piston during reciprocation of the piston in the cylinder; said valving means comprising a circular series of passageways through said piston, said passageways having discharge orifices through a substantially flat face of the piston; and a stack of flexible valve discs secured centrally to said piston and having its marginal portion overlying at least partially said orifices, said stack comprising discs of decreasing diameter and increasing thickness counted in the direction away from said piston face.

2. The shock absorber as set forth in claim 1 in which the number of discs in each stack is selected from three, four, and five.

3. The shock absorber as set forth in claim 1 in which the face of the piston through which the controlled orifices open is marginally provided with a skirt extending in the axial direction and in sliding contact with the wall of the cylinder to increase the area of guiding surface of contact between the piston and cylinder walls, the orifices and valving occurring within the circular confines of said skirt.

4. A direct-acting telescoping cylinder-and-piston shock absorber comprising a cylinder enclosing a working chamber containing a damping liquid; a working piston disposed for reciprocation in said damping liquid within said chamber and having a piston rod fixedly secured thereto and extending through a packed opening in one end of said cylinder; valving means in the piston for the controlled passage of damping liquid in opposite directions through the piston during reciprocation of the piston in the cylinder; said valving means comprising one circular series of passageways through the piston for the passage of damping liquid from one side of the piston to the other, and another circular series of passageways for the passage of damping liquid from said other side to the first named side; said first series of passageways having discharge orifices through one substantially flat face of the piston and the other series having discharge orifices through the opposite substantially flat face of the piston; a stack of flexible valve discs secured centrally against each face of said piston and having its marginal portion overlying at least partially the series of outlet orifices through the piston face against which it is secured; said stack comprising discs of decreasing diameter and increasing thickness counted in the direction away from said piston face, at least the innermost disc adjacent the piston face being cut away at certain segments thereof to uncover substantially the inlet orifices of the passageways of the series which the discs do not control.

5. The shock absorber as set forth in claim 4 in which at least one face of the piston is provided with a marginal skirt extending in the axial direction and in sliding contact with the wall of the cylinder to increase the area of guiding surface of contact between the piston and cylinder wall, the orifices and valving upon that face of the piston occurring within the circular confines of said skirt.

6. The shock absorber as set forth in claim 4 in which the piston is multiple headed, each piston head being provided with the passageways and orifices as described and furnished with such stacks of valve discs upon each face of each piston head.

7. A direct-acting telescoping cylinder-and-piston shock absorber comprising a cylinder enclosing a working chamber containing a damping liquid; a double headed working piston and rod assembly disposed for reciprocation in said damping liquid within said chamber and consisting of two substantially identical cylindrical heads disposed serially in the axial direction and a solid imperforate piston rod extending through a packed opening in one end of said cylinder, and means securing said heads to said rod in fixed axially spaced relationship; valving means in each head of the piston for the controlled passage of damping liquid in opposite directions through the piston heads during reciprocation of the piston in the cylinder; said valving means consisting solely of one circular series of passageways through each of the piston heads for the passage of damping liquid from one side of the piston head to the other in the same axial direction relative to the shock absorber, and another circular series of passageways in each head for the passage of damping liquid from said other side to the first named side in the opposite axial direction; said first series of passageways having discharge orifices through one substantially flat face of each of the piston heads and the other series having discharge orifices through the other substantially flat face of each of the piston heads; a stack of flexible valve discs secured centrally against each face of each of said piston heads and having its marginal portion overlying at least partially and controlling the series of outlet orifices through the piston face against which it is secured, the two piston heads being substantially identical in valving arrangement rather than being symmetrical or mutual mirror images; all whereby the effects of the valving in the two heads in a given direction of movement of the piston are cumulative, and thus the resistance required of each piston head is reduced by one-half from that required in a single piston head installation.

References Cited in the file of this patent

UNITED STATES PATENTS

| | | |
|---|---|---|
| 919,036 | Langer | Apr. 20, 1909 |
| 2,225,986 | Glezen | Dec. 24, 1940 |
| 2,327,295 | Whisler | Aug. 17, 1943 |
| 2,646,859 | Read et al. | July 28, 1953 |
| 2,696,278 | Bonn | Dec. 7, 1954 |
| 2,740,500 | Brundrett et al. | Apr. 3, 1956 |
| 2,987,146 | Allinquant | June 6, 1961 |
| 3,003,594 | Carbon | Oct. 10, 1961 |